May 28, 1935.　　　J. W. TATTER　　　2,002,841
CLUTCH
Filed April 9, 1931　　　2 Sheets-Sheet 2

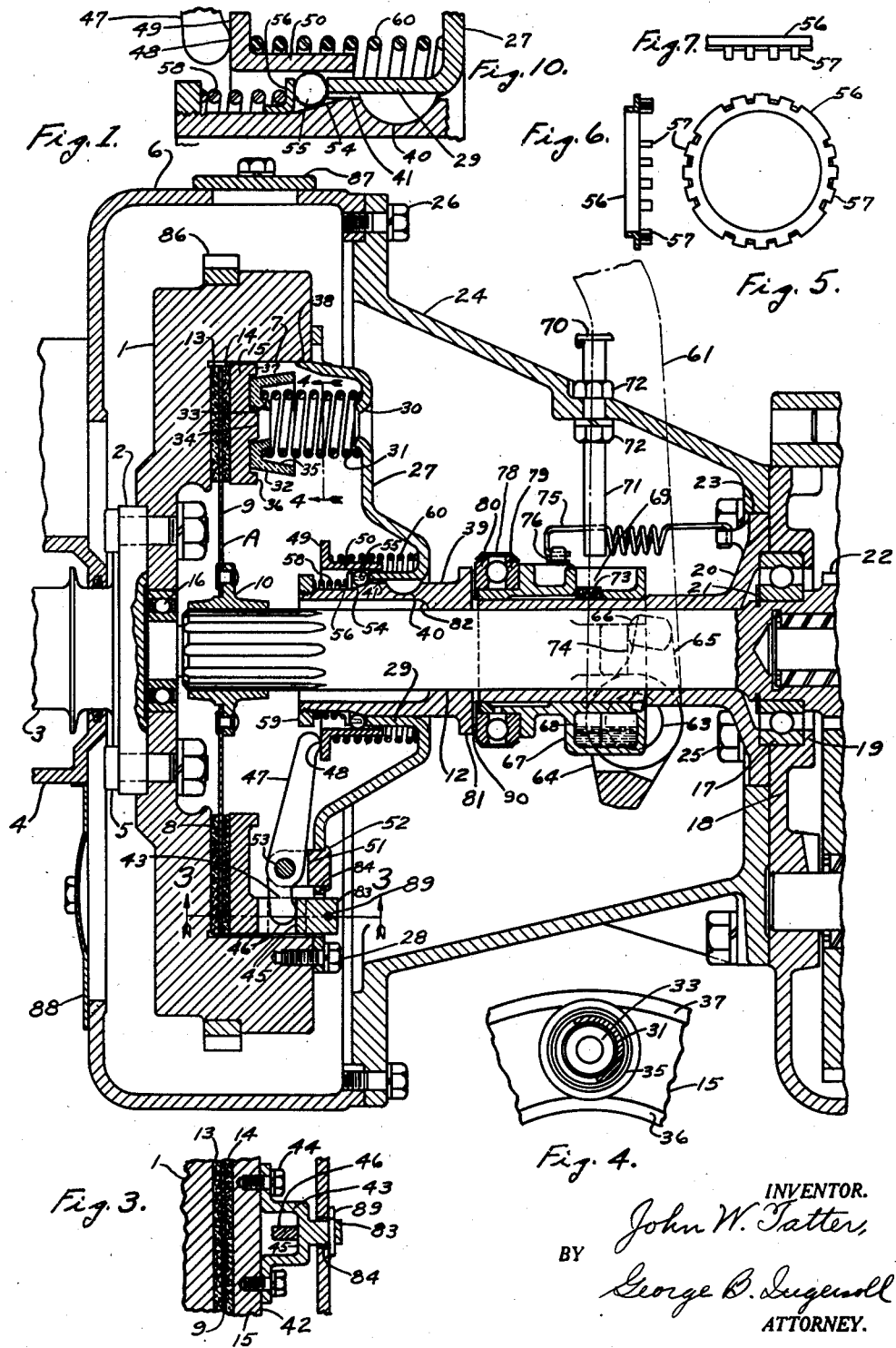

INVENTOR.
BY John W. Tatter,
George C. Ingersoll.
ATTORNEY.

Patented May 28, 1935

2,002,841

UNITED STATES PATENT OFFICE 2,002,841

CLUTCH

John W. Tatter, Detroit, Mich., assignor, by mesne assignments, of one-half to Ella I. Ingersoll, Dearborn, Mich.

Application April 9, 1931, Serial No. 528,861

30 Claims. (Cl. 192—111)

My invention relates to improvements in clutches for motor vehicles, said clutches comprising friction members, and the objects of my improvement are, first, to provide a clutch with automatic means for taking up wear in friction members, said means being located on telescoping members around a clutch shaft; second, to provide a clutch with automatic wear take-up means together with friction members actuated by a plurality of levers, each of the levers being located away from the remainder of said levers; third, to provide a clutch with automatic means for taking up the wear in friction members, said means comprising ball members mounted on the clutch throwout member on the clutch shaft; fourth, to provide a clutch, having automatically operated wear take-up means, with friction members actuated in engagement by a plurality of single levers, said clutch being of push type operation; fifth, to provide a clutch having a movable thrust member slidably engaging a fixed cover member; sixth, to provide a clutch having operating means comprising a plurality of locking members movably actuated by the operating means; seventh, to provide a clutch having a plurality of concentric operating members for releasing and engaging the clutch, with locking means between the concentric members; and eighth, to provide a clutch operating mechanism with an over-running mechanism.

I attain these objects by the mechanism illustrated in the accompanying drawings, in which—

Figure 9:
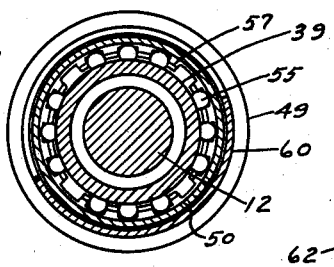
Figure 8:
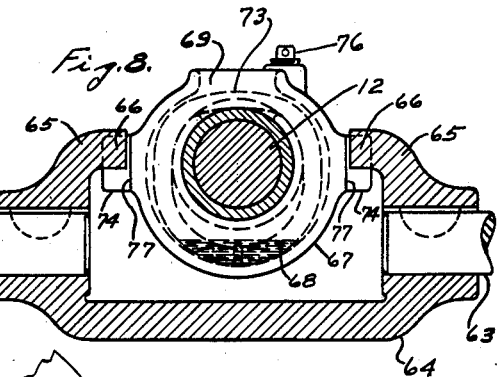
Figure 2:
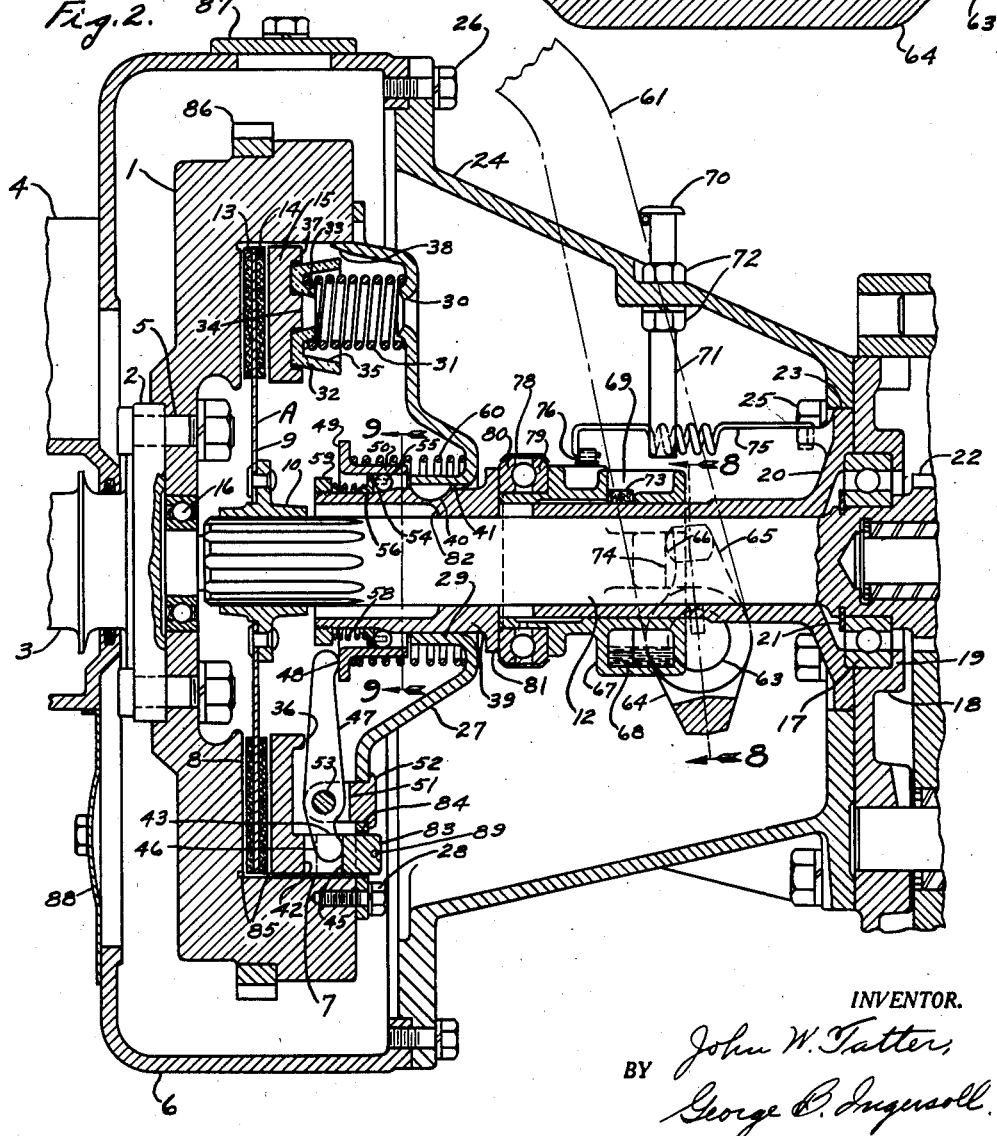

Figure 1 is a sectional view of the clutch assembly within the flywheel of a motor together with its enclosing housings, said view disclosing the clutch members in their engaged position; Fig. 2, a sectional view of the clutch assembly within the flywheel of a motor together with its enclosing housings, said view disclosing the clutch in its disengaged position; Fig. 3, a sectional view taken on the line 3—3, Fig. 1; Fig. 4, a sectional view taken on the line 4—4, Fig. 1; Fig 5, a front elevation of the ball retaining member; Fig. 6, a side view of the ball retaining member; Fig. 7, a partial plan view of the ball retaining member; Fig. 8, a sectional view taken on the line 8—8, Fig. 2; Fig 9, a sectional view taken on the line 9—9, Fig 2; and Fig. 10, a partial longitudinal section disclosing a locking ball member in an unlocked but associated position relative to its sleeve members, said partial section being taken on the center line of the clutch assembly.

Similar numerals refer to similar parts throughout the several views.

The flywheel 1 is mounted on the flange 2 of a crankshaft 3 of an engine, supported in the crankcase 4. The flywheel 1 is held onto the flange 2 by the bolts 5. The crankcase 4 is provided with a bell housing 6 in which the flywheel 1 revolves. The flywheel 1 is provided with the chamber 7, together with the friction face 8. The driven member assembly A comprises the friction disc 9 which is fastened to the hub 10, the hub 10 being suitably mounted on the splines of the shaft 12. The friction members 13 and 14 may be suitably fastened to the friction disc 9, the friction member 13 being disposed between the friction face 8 of the flywheel 1 and the face of the friction disc 9. Friction member 14 is similarly disposed between the friction disc 9 and the thrust member 15. The shaft 12 is supported at its front end in the bearing assembly 16, which is mounted in a recess of the flywheel 1, and at its rear end in the bearing assembly 17, which is mounted in the transmission housing 18.

The bearing assembly 17 is maintained by the shoulder 19 of the transmission housing 18 and also by the retainer 20, which is suitably fastened to the transmission housing 18. The bearing assembly 17 is further retained on the shaft 12 by the retainer 21, the shaft 12 incorporating the gear member 22, as similarly used in the usual type of transmission. The retainer 20 may be piloted in the bore 23 of the clutch housing 24, the clutch housing 24 being suitably fastened to the transmission housing 18 by the screws 25. The clutch housing 24 is fastened to the rear face of the bell housing 6 by the screws 26.

The cover member 27 is fastened to the rear face of the flywheel by the screws 28, the cover member 27 being provided with an extension portion 29. The cover member 27 is provided with a series of depressed portions 30, which fit within and locate one end of the springs 31, which are thus supported against the cover member 27 and exert a thrust against the baffle members 32. The baffle members 32 are each provided with the boss 33, which locates the spring 31 at its forward end. The baffle member 32 is located by loosely fitting over the boss 34 of the thrust member 15. The boss 34 may have tapered sides to provide for economical manufacturing, the tapered sides of the boss 34 fitting within similar tapered holes in the recess in the boss 33 of the baffle member 32.

It is to be noted that the baffle member 32 has its outer wall portion so located as to provide an enlarged recess portion 35 around the inner end of the spring 31. The recess portion 35 has its inner wall surfaces located away from the inner end of the spring 31, the walls of the recess portion 35 extending outwardly from the thrust member 15 to provide a member for baffling the heat generated in the thrust member 15 away from the springs 31. To further prevent the heat, which will be developed in the thrust member by the operation of the clutch, from being conducted into the spring 31, the baffle member 32 is constructed of insulator material, such as asbestos composition material, having a very low coefficient of heat conductivity. It will thus be noted that the heat which is generated in the thrust member 15 will be unable to be conducted through the baffle member 32 to the spring 31 and also the baffle member 32 will further protect, by its walls surrounding the recess portion 35, the spring 31 from receiving radiant heat directly onto the coils of the spring 31. This construction will provide means for eliminating the breaking down of the springs 31 due to the radiated and conducted heat from the thrust member 15 which constitutes a great weakness of design in the usual type of clutch assembly incorporating thrust springs of this type located in close proximity to the clutch thrust members.

It is to be further noted that the small holes which are made in the cover member 27 are located within the end of the spring 31, thus forming a ventilating opening at the rear end of the springs, this further facilitating the maintaining of the spring 31 from taking a set or collapsing from heat in the springs. This small hole communicating directly with the space within the clutch housing 24 outside of the cover member thus maintains a supply of circulated air for each individual spring. The thrust member 15 is provided with the extension portion 36 at its inner edge and the extension portion 37 at its outer edge, which provide added strength for resisting thrust reactions. The cover member 27 is provided with a series of projections 38 which may be used for piloting the cover member 27 into the chamber 7 of the flywheel 1.

The projections 38 may be formed by making suitable openings in the cover member 27 and displacing the metal of the openings to provide the extensions 38 at the proper point for piloting purposes, the outer surfaces of the projections 38 being suitably finished to pilot dimensions. The sleeve member 39 is slidably mounted in the extension portion 29 of the cover member and is restrained from turning therein by the key 40, the key 40 engaging the keyway 41 of the extension portion 29 together with the sleeve member 39. The thrust member 15 is provided with the surface 42 to which are fastened the members 43 by the screws 44. Between the surfaces 42 and the surface 45 of the member 43 a chamber is thus provided for receiving the outer ends 46 of the levers 47. The levers 47 are provided at their inner portions with the ends 48 for engaging the flange 49 of the sleeve member 50. The levers 47 are pivotally mounted in the yoke members 51, the yoke members 51 being provided with portions 52 for riveting to the cover member 27, the portions 52 having a rectangular shape to prevent turning in the cover member 27. A pin 53 extends through the lever 47 and the forked portion of the yoke member 51.

The sleeve member 39 is provided with the inclined surface 54 which extends around the sleeve 39 and engages the balls 55, the balls 55 further engaging the ends of the extension portion 29 of the cover member 27 together with the inside surface of the sleeve member 50, the balls 55 being held in the retainer member 56, the retainer member being provided with portions 57 for separating the balls 55. Any suitable number of balls 55 may be provided to withstand any given loads as developed by the clutch mechanism. The retainer 56 is slidably mounted on the sleeve 39 and is engaged by the spring 58 which always forces the retainer 56 and the balls 55 toward an engaged position with the inclined surface 54 and the inside diameter of the sleeve member 50. The nut 59 is suitably mounted on the sleeve member 39 for taking the pressure of the spring 58. The spring 60 is interposed between the cover member 27 and a face of the flange 49 of the sleeve member 50, the spring 60 always tending to maintain the flange 49 of the sleeve member 50 in engagement with the levers 47.

The pedal 61 is suitably mounted on and connected to the shafts 62 and 63, the shafts 62 and 63 being suitably connected to and supporting the yoke member 64, the pedal 61 being located on the outside of the clutch housing 24 in the conventional manner as employed in motor vehicles. The shafts 62 and 63 are suitably supported in bearings carried on opposite sides of the clutch housing 24. The yoke member 64 is provided with a pair of arms 65 which extend upwardly on each side of the main shaft 12 and are provided with rounded extension portions 66, which engage the rear face of the portions 74 of the member 67. The member 67 is provided with the lubricant reservoir 68 which is formed by a chamber extending around the shaft 12 and the retainer 20, the retainer 20 having a bearing portion on which the member 67 is slidably mounted. The member 67 is provided with an opening 69 at its top which permits the introduction of lubricant to the reservoir 68 from the outside of the clutch housing 24, the lubricant being introduced through the oil cup 70 which is suitably fastened to the tube 71 which extends to a position adjacent the opening 69 of the member 67. The tube 71 is suitably fastened in the clutch housing 24 by the nuts 72.

A wick 73 extends around the inside of the reservoir 68 and contacts with the retainer 20 through a suitable opening in the upper portion of the member 67, thus providing for carrying the lubricant from the reservoir 68 to the upper portion of the retainer 20, on which the member 67 slidably operates. The member 67 is provided with the portions 74 for engaging the extension portions 66 of the arms 65. A spring 75 attaches to the retainer 20 and to the threaded member 76 which is suitably connected to the member 67, the spring 75 always tending to maintain the portions 74 of the member 67 in contact with the extension portions 66 of the yoke member 64. Also, the member 67 is provided with surfaces 77 which extend adjacent the inner ends of the extension portions 74, so that the member 67 is prevented from turning on the retainer 20. The member 67 also supports the bearing assembly 78, the ball race 79 being a pressed fit on the member 67, the ball race 80 contacting with the flange 81 of the sleeve 39, the ball race 80 being adapted to turn freely without engaging the member 67. The sleeve 39 is provided with a boss portion 82, which has a bearing on the shaft 12, the boss portion 82 thus aiding in guiding the sleeve 39 in its movement during the operation of the clutch.

It is to be noted that members 43 are provided with an extension portion 83 which extends through the opening 84 in the cover member 27, the cover member 27 thus providing a driving engagement with extension portion 83, thus in turn providing driving means for the thrust plate 15. It is to be noted that, when the operator depresses the pedal 61, the yoke member 64 to which the pedal is operatively connected will slidably move the member 67, which will force the race member 80 of the bearing assembly 78 against the flange 81 of the sleeve 39, the race member 80 being adapted to turn freely with the sleeve 39 when the flywheel 1 is revolving, the race member 79 remaining stationary on the member 67. As the sleeve 39 is slidably moved forward by the operation of the pedal 61, the inclined surface 54 of the sleeve 39 will force the balls 55 against the inside surface of the sleeve member 50.

It is to be noted that the inclined surface 54 extends completely around the sleeve 39 and, when moved forward, will wedge the balls into a locking position, thus causing the sleeve member 50 to also move forward with the movement of the sleeve 39, the flange 49 of the sleeve member 50 moving the ends 48 of the lever 47 towards the thrust member 15. The movement of the inner ends of the lever 47 toward the thrust member 15 will cause the ends 46 of the lever 47 to engage the surfaces 45 of the member 43, this in turn causing the thrust member 15 to move against the pressure of the springs 31 to a released position, as shown in Fig. 2, this released position of the clutch thus establishing the clearance spaces 85 between the friction members 13 and 14 and their engaging surfaces.

As the operator releases the pressure on the pedal 61 to allow the clutch to move from its released position as shown in Fig. 2 to a fully engaged position as shown in Fig. 1, the springs 31 will force the thrust member 15 forward to its engaged position with the friction members 13 and 14, as disclosed in Fig. 1, this in turn causing the member 43 to move the end 46 of the lever 47 toward the thrust member 15, this in turn causing the end 48 of the lever 47 to move rearwardly against the flange 49 of the sleeve member 50 and against the pressure of the spring 60, the pressure of the spring 60 being much less than the combined pressures of the springs 31. The sleeve 50 being still locked by the balls 55 engaging the inclined surface 54 of the sleeve member 39 and the inside surface of the sleeve member 50 will cause the sleeve member 39 together with the member 67 and the bearing assembly 78 to move back to its released position as shown in Fig. 2. As the sleeve member 39 moves rearwardly to its position as shown in the released position of the clutch, as disclosed in Fig. 2, the inclined surface 54 will move to the right. The balls 55 will be released from their locked position with the inner surface of the sleeve member 50 and the inclined surface 54, the balls 55 however still being lightly maintained and associated in engagement with the inner surface of the sleeve member 50, and the pressure of the spring 58 will tend to always maintain the inclined surface 54, of the sleeve 39, in engagement with the balls 55, this further causing the balls 55 to lightly engage the inner end of the extension portion 29 of the cover member 27, the inner surface of the sleeve member 50 and the retainer member 56 when the clutch is in its engaged position, as in Fig. 1. It is to be noted, however, that the balls 55 are always maintained in associated contact with the end of the extension portion 29 of the cover member 27 by the retainer 56 being forced by the pressure of the spring 58 into engagement with the balls 55. This relatively light engagement pressure of the balls 55 with the inner surfaces of the sleeve 50 when the clutch is in its fully engaged position will allow the springs 31, every time the clutch is operated to its engaged position, as disclosed in Fig. 1, to cause the levers 47 to move the sleeve member 50 rearwardly an additional distance, which will correspond to the amount of the wear taking place on the friction members 13 and 14, the light engagement pressure of the balls 55 against the inner surface of the sleeve 50 being only of such magnitude as will be developed by the relatively light spring 58 forcing the balls 55 along the inclined surface 54 of the sleeve 39.

It will thus be seen that every time the clutch is operated the balls 55 will be unlocked sufficiently from their locked engagement to allow the springs 35 to cause the thrust member 15 to always move forwardly into engagement with the friction members 13 and 14, to take up any wear that may have occurred on the friction members 13 and 14. It will thus be seen that the clutch will provide automatically for always taking up the wear clearance which may occur in its driving mechanism, so that the pedal 61 will not have to be adjusted to maintain said pedal in its proper operating position. Also, the thrust member 15 will not have to be manually adjusted in any way to take up wear clearances. The flywheel 1 is disclosed as being provided with a starting ring 86. Also, the bell housing 6 is provided with inspection covers 87 and 88.

The members 43 may be provided with holes in their extension portions 83 to receive the pins 89 for holding the thrust member 15 in assembly with the baffle member 32, the spring 31, and the cover member 27 for shipment purposes. After the clutch has been assembled in the flywheel 1, the pins 89 may be removed and the extension portions 83 then will be permitted to slidably move in the cover member 27 when the clutch is operated.

It is to be noted that, when the clutch is in its fully engaged position, as disclosed in Fig. 1, a clearance space 90 will be established between the flange 81 of the sleeve 39 and the ball race 80.

I claim:

1. In a friction clutch, the combination of a driving member, a driven member, a clutch main shaft, a thrust member engaging said driven member, means for forcing said thrust member into engagement with said driven member, and automatically operated means for taking up clearance due to wear of said driven member, said automatically operated means comprising a plurality of ball members surrounding said clutch main shaft.

2. In a clutch, the combination of a driving member, a thrust member, a driven member, a cover member closing said driving member, said cover member being provided with a central extension portion, and automatically operated clearance take-up means operatively connected with said thrust member, said automatically operated clearance take-up means engaging the center extension portion of said cover member.

3. In a clutch, the combination of a driven member, means for driving said driven member, a clutch shaft operatively connected with said driven member, a thrust member for engaging said driven member, a pair of telescoping members, one of said telescoping members surrounding said clutch shaft being operatively connected with said thrust member, a fixed member between said pair of telescoping members, and a yieldable clutch device constructed to release said pair of telescoping members in response to relative axial movement of said pair of telescoping members in one direction and to lock said pair of telescoping members together against relative axial movement in the other direction, said yieldable clutch device engaging said fixed member between said pair of telescoping members.

4. In a clutch, the combination of a driving member, a thrust member, a driven member arranged to have a clearance relative to said driving and said thrust members, a fixed member, said fixed member being located concentrically with said driven member, and an automatically operated clearance take-up device suitably supported concentrically with said driven and said fixed members, said automatically operated clearance device having portions enclosing portions of said fixed member.

5. In a friction clutch, the combination of a driving member, a driven member, a cover member fixed to one of said members and enclosing the other of said members, a thrust member movable longitudinally relative to said cover member, a sleeve member extending through said cover member, adjustable means mounted on said sleeve member and said cover member, said adjustable means comprising a pair of resiliently operated members, a lever pivotally mounted within said cover member, said lever engaging one of the resiliently operated members of said adjustable means, said lever engaging said thrust member to move said thrust member, and a plurality of resilient members supported on said cover member, said resilient members forcing said thrust member into engagement with said driven member.

6. In a friction clutch, the combination of a driving member, a driven member, a cover member fixed to one of said members and enclosing the other of said members, a thrust member movable longitudinally relative to said cover member, a lever pivotally mounted within said cover member, said lever engaging said thrust member, a sleeve member extending through said cover member, a sleeve member adjacent said first mentioned sleeve member, said last mentioned sleeve member engaging said lever, resilient means engaging said second mentioned sleeve member, resilient means between said thrust member and said cover member, and an automatically operated clearance take-up means engaging said first mentioned and said second mentioned sleeve members.

7. In a clutch, the combination of a driving member, a thrust member, a cover member fixed to one of said members, said cover member being provided with an inwardly extending portion, a sleeve member extending within the inwardly extending portion of said cover member, spherical members engaging the inwardly extending portion of said cover member, together with said sleeve member, means for causing said spherical members to engage the inwardly extending portion of said cover member, a sleeve member extending around the inwardly extending portion of said cover member, said last mentioned sleeve member engaging said spherical members, resilient members between said last mentioned sleeve member and said cover member, and a lever engaging said last mentioned sleeve member and said thrust member.

8. In a clutch, the combination of a sleeve member suitably mounted, pedal means for slidably moving said sleeve member to release and engage the clutch, a sleeve member adjacent said first mentioned sleeve member, resilient means engaging said second mentioned sleeve member, and means for locking said first mentioned and said second mentioned sleeve members together when the clutch is being released, said last mentioned means being unlocked from said first mentioned and said second mentioned sleeve members when the clutch is in an engaged position.

9. In a clutch comprising a sleeve member having a straight bore, the combination of pedal means for releasing the clutch, a sleeve member movably operated by said pedal means, and spherical means engaging the straight bore of said first mentioned sleeve member and said second mentioned sleeve member, said spherical means taking the thrust load of said sleeve member when said sleeve member is being operated to release the clutch.

10. In a clutch, the combination of a slidably mounted member, a fixed member around said slidably mounted member, ball members engaging said fixed member, a member around said slidably mounted member, said last mentioned member engaging said ball members, means for maintaining said last mentioned member, said ball members, and said fixed member in engagement, a member further engaging said ball members, and lever means engaging said last mentioned member.

11. In a clutch, the combination of a cover member for the clutch, said cover member being provided with an extension portion, and an automatically operated take up mechanism mounted within the extension portion of said cover member, said automatically operated take up mechanism comprising rollably mounted members engaging the end surface of the extension portion of said cover member.

12. In a clutch, the combination of slidably mounted means for operating the clutch to a released position, said slidably mounted means being retained from rotating when the clutch is in an engaged position, means for moving said slidably mounted means to operate the clutch to a released position, and an automatically operated means for taking up wear, said automatically operated means being located within the clutch, said automatically operated means having no contactual engagement with said slidably mounted means when the clutch is in its engaged position, said automatically operated means further having portions engaging said slidably mounted means when the clutch is being operated to its released position.

13. In a clutch, the combination of a clutch shaft, means for controlling release and engagement of the clutch, said means comprising a manually movable sleeve member together with a sleeve member associated with the clutch, both of said sleeve members surrounding said clutch shaft, and means effective only for establishing an operable locked connection between said sleeve members of said first mentioned means when said sleeve members of said first mentioned means are manually moved to operate the clutch to a released position, said last mentioned means being associated with said sleeve members of said first mentioned means at all times, said last mentioned means permitting said sleeve members of said first mentioned means to move relative to one another to compensate for wear of the clutch.

14. In a friction clutch, the combination of a driving member, a driven member, a cover member fixed to one of said members, a thrust member movable longitudinally relative to said cover member, a plurality of levers, each of said levers being suitably mounted away from the remainder of said levers, resilient means tending to move said levers to move said thrust member, means operatively interposed between said resilient means and said levers, a plurality of rollably mounted members engaging said second mentioned means, said rollably mounted means being located within said second mentioned means, a tapered sleeve member located within and engaging said rollably mounted means, and means for causing said rollably mounted members to engage said second mentioned means to lock said second mentioned means and said tapered sleeve member against relative movement.

15. In a clutch, the combination of a driving member, a thrust member, a driven member arranged to have operating clearance in a released position, a clutch shaft operatively connected with and adapted to revolve with the clutch, and means for operating said thrust member to a released position, said means including a pair of members suitably mounted around said clutch shaft, said means further including a plurality of rollably mounted members between said pair of members for causing said pair of members to move together as a unit, said plurality of rollably mounted members further permitting said pair of members to be relatively movable with respect to one another to take up clearance due to wear of said driven member.

16. In a clutch, the combination of a driven friction member, means for driving said driven friction member, a clutch shaft suitably supported and operatively connected with said driven member, a pair of members telescopically arranged relative to each other, said pair of members surrounding said clutch shaft, and means between said pair of members for locking said pair of members together, said means permitting relative axial movement of said pair of members in opposite directions to take up clearance due to wear of said driven friction member.

17. In a friction clutch, the combination of a friction member suitably mounted to transmit driving torque, and means for disengaging said friction member from its position of transmitting driving torque, said means including a pair of telescoping members located concentrically with said friction member, said means further including a clutching mechanism between said pair of telescoping members to permit said pair of telescoping members to move relative to one another to continually take up clearance due to wear of said friction member.

18. In a friction clutch, the combination of a driving member, a driven member, a thrust member movably longitudinally relative to said driving member, a lever suitably mounted and operatively connected with said thrust member for moving said thrust member, said lever being restrained from movement relative to said thrust member, in a plane extending at right angles to the axis of the friction clutch, and automatically operating means for adjusting said lever relative to said thrust member, said means including a pair of sleeve members concentrically mounted and a pair of resilient members concentrically mounted together with locking means between said pair of sleeve members.

19. In a clutch provided with a movable thrust member, the combination of a shaft suitably mounted and adapted to rotate, said shaft being fixed against longitudinal movement, a pair of sleeve members telescopically mounted with said shaft and with each other, a pair of resilient members each exerting a thrust on one of said pair of sleeve members, means for locking said pair of sleeve members together, and means for operatively connecting one of said sleeve members with said thrust member.

20. In a clutch operating mechanism, the combination of a movable sleeve member mounted axially with the clutch, a plurality of rollably mounted members around said movable sleeve member, a member fixedly mounted against longitudinal movement of the clutch, and means for causing said rollably mounted members to engage said member, fixedly mounted against longitudinal movement, when the clutch is in an engaged position.

21. In a clutch, the combination of a pair of movably mounted sleeves located concentrically with the clutch, rollably mounted members engaging said pair of sleeves, means preventing said rollably mounted members from moving axially of one of said sleeve members in one direction, beyond a predetermined position, and retaining means for said rollably mounted members, said retaining means actuating said rollably mounted members to engage said pair of movably mounted sleeves.

22. In a clutch, the combination of a cover member suitably mounted to form a closure member for the clutch, said cover member being provided with a portion having a bore, a member slidably mounted in and extending through the bore of said cover member, a plurality of rollably mounted members suitably mounted adjacent and adapted to engage the inner end of said portion of said cover member, said plurality of rollably mounted members engaging said member slidably mounted in said bore, a second member provided with a bore engaging said plurality of rollably mounted members, said second member being operatively connected with the clutch, and a lever member suitably mounted and operatively connected with said member slidably mounted in the bore of said cover member, said lever member moving said member slidably mounted in the bore of said cover member, said plurality of rollably mounted members, and said second member provided with a bore engaging said plurality of rollably mounted members when the clutch is operated to a disengaged position.

23. In a clutch, the combination of a friction member suitably mounted, a thrust member movably mounted and adapted to engage said friction member, a cover member suitably mounted and adapted to revolve with the clutch, lever members suitably mounted for moving said thrust member, a pair of telescopic members movably mounted and adapted for movement relative to each other, one of said pair of telescopic members extending through said cover member, one of said pair of telescopic members being operatively connected with said lever members, a plurality of rollably mounted members engaging said pair of telescopic members to lock said telescopic mounted members against movement relative to each other, and suitably mounted lever mechanism for actuating said telescopic members, extending through said cover member, to further actuate said thrust member.

24. In a clutch, the combination of a shaft suitably mounted and adapted to revolve, said shaft being restrained from substantial longitudinal movement, a sleeve member suitably mounted and adapted to move longitudinally, said sleeve member extending around said shaft, said sleeve member being provided with an inclined surface, a member operatively connected with the clutch, a plurality of rollably mounted members engaging said member, operatively connected with the clutch, and the inclined surface of said sleeve member, and means for retaining said plurality of rollably mounted members in their engaged position with said members.

25. In a clutch, the combination of a shaft suitably mounted to permit rotation and to prevent substantial longitudinal movement thereof, a pair of members adapted for longitudinal movement relative to each other and to said shaft, a plurality of rollably mounted members for locking said pair of members together, and means for maintaining said rollably mounted members in engagement with said pair of members when said pair of members are not locked together.

26. In an adjusting mechanism for a clutch, the combination of a pair of members adapted to move longitudinally, a plurality of rollably mounted members locking said pair of members together, resilient means urging said rollably mounted members to engage said pair of members, said resilient means further urging one of said pair of members to move toward the clutch, resilient means urging the other of said pair of members toward the clutch, and lever means for moving said pair of members and said rollably mounted members toward the clutch.

27. In a clutch adapted to revolve, the combination of a friction member, a member provided with an annular portion, said second mentioned member being suitably mounted and adapted to revolve with the clutch, said second mentioned member being restrained from longitudinal movement, a thrust member engaging said friction member, and automatically operated means for taking up clearance between said friction member and said thrust member, said automatically operated means comprising ball members engaging the annular portion of said second mentioned member.

28. In a clutch, the combination of means for exerting pressure for operating the clutch to a released position, and an automatically adjustable means for taking up wear in the clutch, said last mentioned means including a rollably mounted member engaging a pair of movably mounted members, said rollably mounted member of said automatically adjustable means being locked in engagement with said pair of movably mounted members by the pressure exerted by said first mentioned means to operate the clutch to a released position, said automatically adjustable means further including means for maintaining said rollably mounted member in contact with said pair of movably mounted members with a relatively light engagement pressure to permit relative movement of said pair of movably mounted members when the clutch is in its engaged position.

29. In a clutch, the combination of clutch main shaft, an automatically adjustable means for taking up wear in the clutch, said automatically adjustable means comprising a pair of movably mounted sleeve members surrounding said clutch main shaft together with rollably mounted members for locking said pair of sleeve members together, and means for operating the clutch to a released position, said last mentioned means comprising a bearing assembly supported independently of said movably mounted sleeve member and said clutch main shaft, said bearing assembly being adapted to engage said movably mounted sleeve member, said bearing assembly being separated from said movably mounted sleeve member by a relatively slight clearance space when the clutch is in an engaged position, the total movement of said last mentioned means, less the movement necessary to transverse the relatively slight clearance space between said bearing assembly and said movably mounted sleeve member, being used to move the clutch to a released position.

30. In a clutch, the combination of a shaft suitably mounted and adapted to revolve, said shaft being restrained from longitudinal movement, a pair of sleeve members suitably mounted around said shaft, said pair of sleeve members being adapted to move longitudinally of said shaft, said pair of sleeve members being adapted to move longitudinally relative to one another while being rotated with said shaft, and locking means between said sleeve members for preventing movement of said pair of sleeve members relative to one another when the clutch is being operated to its released position.

JOHN W. TATTER.